US008462942B2

(12) United States Patent
Berggren et al.

(10) Patent No.: US 8,462,942 B2
(45) Date of Patent: Jun. 11, 2013

(54) METHOD AND SYSTEM FOR SECURING PACKETIZED VOICE TRANSMISSIONS

(75) Inventors: David E. Berggren, Arlington, MA (US); Steven E. Belczyk, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 494 days.

(21) Appl. No.: 12/542,127

(22) Filed: Aug. 17, 2009

(65) Prior Publication Data

US 2010/0166178 A1 Jul. 1, 2010

Related U.S. Application Data

(63) Continuation-in-part of application No. 12/347,015, filed on Dec. 31, 2008.

(51) Int. Cl.
*H04L 9/00* (2006.01)
(52) U.S. Cl.
USPC ............... 380/42; 380/44; 380/270; 380/275; 380/277; 380/283; 713/150; 713/151; 713/171
(58) Field of Classification Search
USPC ...... 380/42, 44, 270, 275, 277, 283; 713/150, 713/171, 151
See application file for complete search history.

(56) References Cited

U.S. PATENT DOCUMENTS

| | | | |
|---|---|---|---|
| 6,889,321 B1 | 5/2005 | Kung et al. | |
| 7,308,101 B2 | 12/2007 | Wing | |
| 7,353,388 B1 | 4/2008 | Gilman et al. | |
| 7,730,309 B2 | 6/2010 | Zimmermann | |
| 7,881,471 B2 | 2/2011 | Spohrer et al. | |
| 8,060,746 B2 * | 11/2011 | Kojima | 713/175 |
| 2003/0005280 A1 | 1/2003 | Bobde et al. | |
| 2003/0065941 A1 * | 4/2003 | Ballard et al. | 713/201 |
| 2003/0088767 A1 | 5/2003 | Emerson | |
| 2004/0059921 A1 | 3/2004 | Bianchi | |
| 2005/0201363 A1 | 9/2005 | Gilchrist et al. | |
| 2005/0228997 A1 * | 10/2005 | Bicker | 713/171 |
| 2006/0236091 A1 | 10/2006 | Kaji et al. | |
| 2007/0198832 A1 * | 8/2007 | Novack et al. | 713/158 |
| 2007/0274525 A1 | 11/2007 | Takata et al. | |
| 2009/0028331 A1 | 1/2009 | Millar et al. | |
| 2009/0158032 A1 | 6/2009 | Costa et al. | |
| 2009/0198997 A1 | 8/2009 | Yeap et al. | |

* cited by examiner

*Primary Examiner* — Edward Zee
*Assistant Examiner* — Baotran N To (57) ABSTRACT

An approach is provided for providing secure packetized voice transmissions. A public/private key pair is generated at a call device (or endpoint). An encrypted voice stream is received from another call device, where the encrypted voice stream was encrypted using a public key of the public/private key pair. This encrypted voice stream when received at the call device is decrypted using a private key of the public/private key pair.

16 Claims, 7 Drawing Sheets

METHOD AND SYSTEM FOR SECURING PACKETIZED VOICE TRANSMISSIONS

RELATED APPLICATIONS

The present application is a Continuation-In-Part of U.S. patent application Ser. No. 12/347,015 filed Dec. 31, 2008, entitled "Method and System for Securing Packetized Voice Transmissions"; the contents of which are hereby incorporated by reference.

BACKGROUND INFORMATION

The popularity and convenience of the Internet has resulted in the reinvention of traditional telephony services. These services are offered over a packet switched network with minimal or no cost to the users. IP (Internet Protocol) telephony, thus, have found significant success, particularly in the long distance market. In general, IP telephony, which is also referred to as voice over IP (VOIP), is the conversion of voice information into data packets that are transmitted over an IP network. Users also have turned to IP telephony as a matter of convenience in that both voice and data services are accessible through a single piece of equipment, namely a personal computer. The continual integration of voice and data services further fuels this demand for IP telephony applications.

Undoubtedly, the Internet has revolutionized personal and business communication by providing a global medium with powerful services such as the World Wide Web, e-mail, and VOIP. The Internet is a conglomeration of numerous heterogeneous networks, which are linked through internetworking devices, without restriction on the systems that can be a part of this global network. Because of the unrestricted nature, network security issues have garnered significant attention, particularly by service providers that need to ensure timely and secure communications for their customers.

Secure handling of sensitive data has become a very important issue. Hackers have become very sophisticated in their techniques for accessing sensitive data stores. Also, with the increasing popularity of VOIP, there is an increasing potential that these hackers may intercept and use information being transmitted during VOIP sessions. As VOIP technology progresses and users are provided with ever-increasing manners in which to access and utilize VOIP communications, the need to secure data transmitted during VOIP sessions will also increase.

Therefore, there is a need for a way to secure data being transmitted during VOIP sessions.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred system, method, and software for providing encrypted voice communications are described. In the following description, for the purposes of explanation, numerous specific details are set forth in order to provide a thorough understanding of the present invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
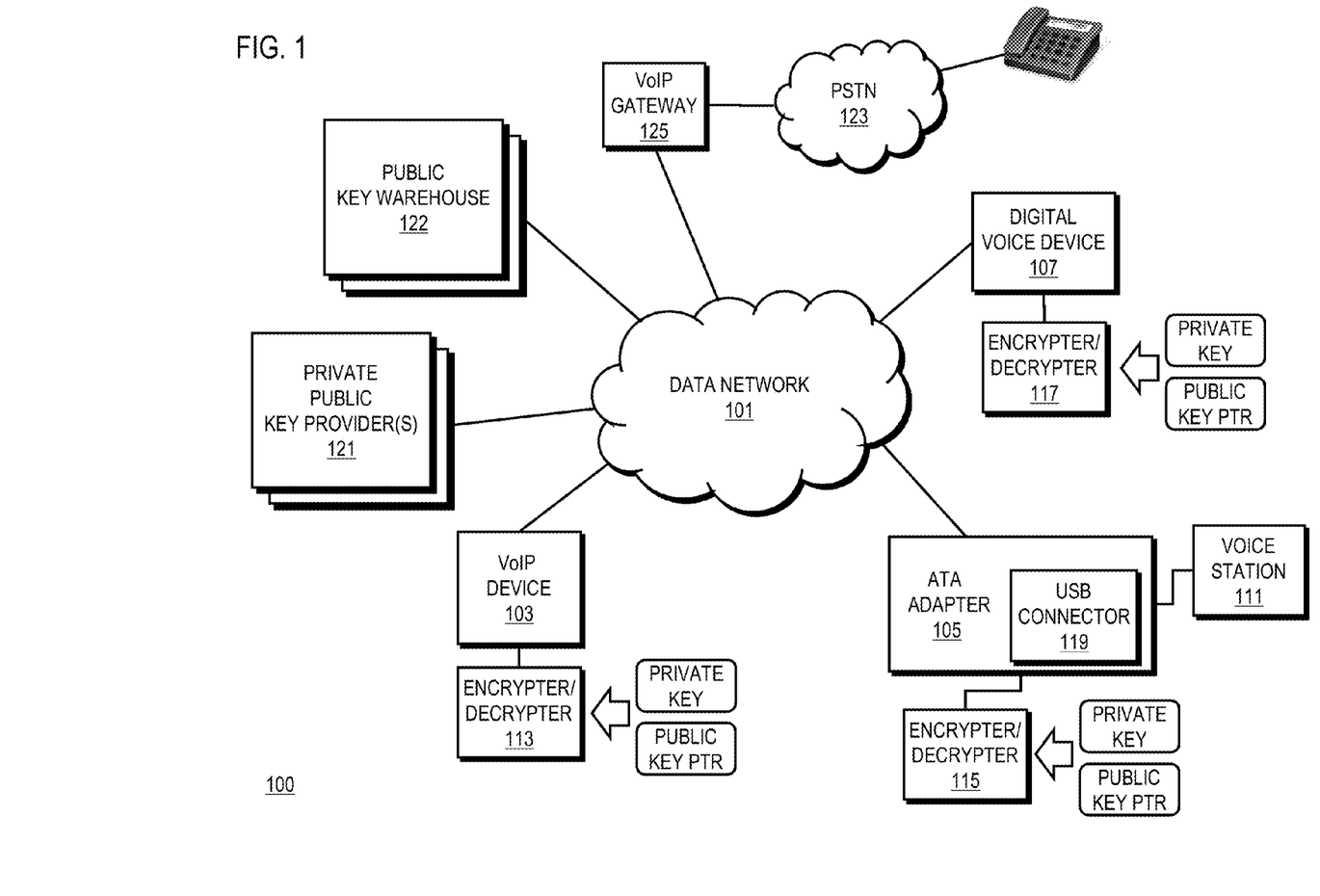
FIG. 1 depicts a data network with endpoints for providing secure encryption of voice communications between users, according to an exemplary embodiment.

FIG. 1 depicts a data network 101 with a secure telephony system for providing secure encryption of voice communications between users, according to an exemplary embodiment. A communication system 100 includes a data network 101 that provides connectivity to a variety of devices 103, 105, and 107 capable of transmitting and receiving packetized voice flows. In this example, the devices 103, 105, and 107 include a Voice-over-Internet Protocol (VOIP) device 103, an analog terminal adapter (ATA) 105, and/or a digital voice device 107 (that can support telephony services over the data network 101). The data network 101 can include a public data network, such as the global Internet. The endpoints (i.e., "call" devices) 103, 105, and 107 can facilitate secure telephony communications among, e.g., voice stations 103, 107, and 111 through the use of encrypter/decrypter modules 113, 115, and 117, respectively; these encrypter/decrypter modules 113, 115, and 117 are capable of encrypting data streams (e.g., voice payload) being sent to the data network 101, and decrypting incoming data streams. Exemplary call devices 103, 105, and 107 include a mobile phone, wireless device, computer, etc. The analog terminal adapter (ATA) 105 performs analog-to-digital (A/D) and digital-to-analog (D/A) conversions to operate with voice station 111, which can be a traditional Plain Old Telephone Service (POTS) phone. It is contemplated that the term "endpoint" can encompass all components for providing encrypted voice payload—e.g., an ATA, VoIP phone, and/or a successor voice device.

Conventionally, VOIP phones used on the Internet pass voice traffic over the public Internet in a manner where this traffic could be captured, and listened to or recorded. For example, the traffic could flow from a POTS (or analog) phone, to an analog terminal adapter (ATA) therein, to the public Internet, to a border controller (BC), to a session initiation protocol (SIP) serving network switch, to a BC, and to either a private switched telephone network (PSTN) or to the public internet to an ATA of a second phone (or without an ATA, directly to a digital VOIP phone). In such a connection, the ATA, VOIP phone and/or successor call device or endpoint digitizes the speech into a codec that is passed over the public internet via a SIP packet through the BC all the other points, another or the same BC, to the public internet, to the ATA device or successor call device, then to the VOIP phone being called. Throughout that SIP packet's existence, any hacker that sniffs that packet off the network, can listen to and/or record the conversation. According to certain embodiments, the above approach can be applied to any standard VOIP call device or endpoint.

In recognition of the above issue, the system 100 protects voice traffic from unauthorized access through the use of encryption at the end devices. By way of example, a secure voice communication session is established between a source call device, e.g., voice station 111, and a destination call device, e.g., device 103. In one embodiment, the ATA 105 of call device 111 can be provided with, for example, a Universal Serial Bus (USB) connector 119 or other removable storage medium port for inserting a flash storage device, which can contain a private key of an asymmetrical public/private key pair (and, e.g., a pointer (or identifier) to where the public key is located). Then, during session initiation at the startup of the call, the encrypter/decrypter 113 of the other party (i.e., destination call device 103) can retrieve the public key of the source call device, and utilize the public key to encrypt data being sent to the source call device. Thus, each time after, the encrypters/decrypters (also referred to as coder/decoder "codec") 115, 117 encrypt the digitized speech using the respective public keys of the devices 103, 111. This encrypted codec using, for example, standard SIP protocol could still be sniffed, but the speech would be very difficult, if not impossible to decipher, without the corresponding private key. Once this SIP packet with the encrypted codec reached the source call device, the private key would be used to decrypt the codec into intelligible speech, which is private to the listener on the source call device.

For example, during session description setup, the originating VOIP ATA 105, VoIP Device 103, Digital Voice Device 107 or endpoints can utilize a session description protocol; this protocol is detailed in Internet Engineering Task Force (IETF) Request for Comment (RFC) 4566, which is incorporated herein by reference in its entirety. In one embodiment, a uniform resource identifier (URI) can be included in the key field. The URI refers to the data containing the public key, and may require additional authentication before the key can be returned. When a request is made to the given URI, the reply should specify the encoding for the key. The URI can be a secure socket layer/transport layer security (SSL/TLS)-protected HTTP URI ("https:"), although this is not required. The five round trips required to set up an SSL connection may slow call set up too much only testing will determine usage. Use of the URI would enable the destination device to retrieve the matching public key, from a private public key vendor/provider 121 (e.g., CYBERTRUST® or VERISIGN®, etc.) or from a public key warehouse 122, via a secure socket layer, thus enabling voice payload (e.g., codecs) passed back to the originating call device (or endpoint) to be encrypted and secure. Similarly, the destination call device (or endpoint) could pass the URI back to the originating call device, thus enabling the originating call device (or endpoint) to retrieve the matching public key from the public key vendor/provider or warehouse via a secure socket layer. This can occur if the destination call device (or endpoint) also contained a private key (which had been successfully challenged). At this point the codecs (voice traffic) in both directions would be secured by the asymmetric public key, which could only be decoded by the corresponding private key in each call device (or endpoint).

A public key warehouse 122 is utilized to serve as a repository for public keys for devices of a particular service provider (e.g., phone company). These public keys are then retrieved during setup of secure communications. In one embodiment, the warehouse 122 can support access to the public keys using uniform resource locators (URLs), which may may not use SSL to access the requisite public keys.

According to certain embodiments, the above mechanism can be implemented between VOIP phones, since the VOIP service provider typically controls the endpoint's software/firmware. Thus, the necessary software can be provided, supported, and distributed to users' call devices (or endpoints) 103, 105, and 107. The private key can be stored in the memory of the call device, or in a removable memory in flash memory that can be plugged into the call device. The call device or endpoint can be equipped with a passcode, such as a user personal identification number (PIN) or password, in order to verify that the proper user is attempting to utilize the secure telephony system. For example, if the ATA or other endpoint determined that a USB PROM (Programmable Read-Only Memory) was connected, if a private key was stored therein, then the user would be prompted for the challenge password, and if the user matches the challenge password, then incoming voice communications could be secured.

It is noted that standard SIP utilizes transmission control protocol (TCP) or user datagram protocol (UDP) to pass traffic. Also, typical VOIP implementations use a UDP transport due to reduced overhead of UDP over TCP. There is a Secure TCP method that is not believed to have been implemented for VOIP due to the statefulness of TCP, which imposes too much overhead on the servers. The Secure TCP method has the drawback that it utilizes many secure TCP connections, which reduces throughput capacity since each server cannot support as many secure TCP connections as it can support stateless UDP connections.

With the system 100, the use of the ATA (105), VOIP (103), Digital Voice (107) smart device at the endpoint to implement the processing of the secure telephony system in the call devices is advantageous since the endpoints (103, 105, 107) have an economical central processing unit (CPU) with significant spare capacity; also, the CPU can be upgraded more economically than central servers. Using the spare CPU capacity of these endpoints to encrypt and decrypt the codecs, advantageously provides the user (or customer) a secure communication from VOIP endpoint to VOIP endpoint. Such services can be charged to the customer for each secure phone call. An additional advantage of this enhanced configuration is that the only devices requiring modification to implement this system would be the inexpensive endpoints (103, 105, 107). Furthermore, there would be no increased demands on the VOIP network provider, and no need for secure TCP connections and its associated increased demands for CPU power and network bandwidth.

As seen in FIG. 1, the secure telephony system 100 also includes one or more private public key providers 121 and public key warehouses 122 that can disseminate public keys to support secure communications. The public keys are supplied by the private public key provider 121 or public key warehouse 122 to endpoint devices 103, 105, and 107; in this example, each of the endpoint devices 103, 105, and 107 utilizes a pointer (e.g., Uniform Resource Identifier (URI)) to retrieve the actual public key from the provider 121 or 122. As such, the public key provider 121 or 122 distributes the public keys to the endpoint devices 103, 105, and 107, as more fully explained in FIG. 3.

As shown, the data network 101 can also provide connectivity to a circuit-switched telephony network, e.g., PSTN (Public Switched Telephone Network) 123, via a VOIP gateway 125 to exchange unsecure voice calls.

Figure 2:
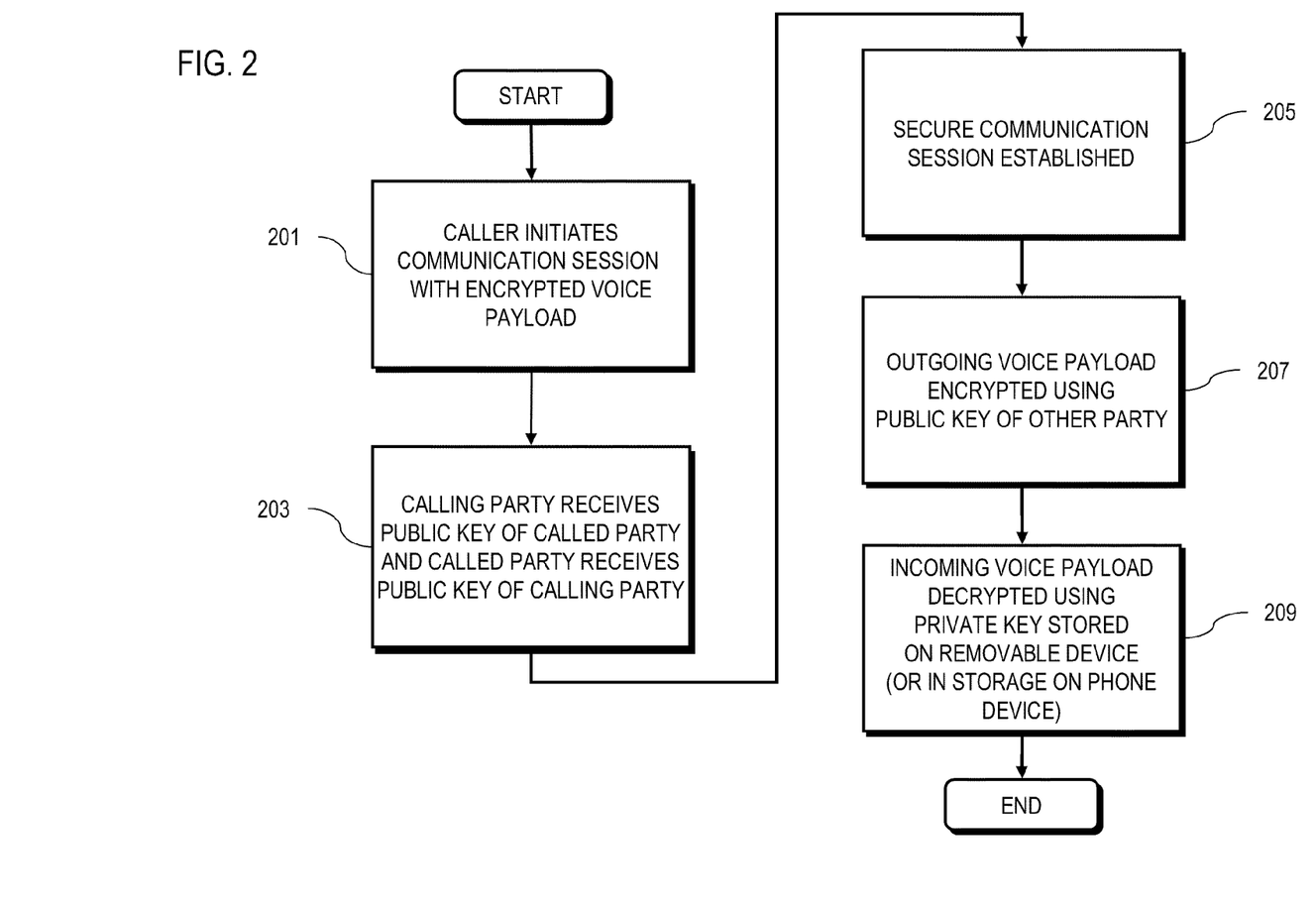
FIG. 2 is a flowchart of a process for initiating a communication session utilizing encrypted voice payloads, in accordance with an exemplary embodiment.

FIG. 2 is a flowchart of a process for initiating a communication session utilizing encrypted voice payloads, in accordance with an exemplary embodiment. This process illustrates a basic operation of the secure telephony service; however, this process does not set forth the details regarding how the private keys are obtained for each of the parties to the call, as such private key exchange can be performed using conventional approaches. Thus, it is assumed that each party to the call has previously received or generated and stored their own private key for use in a secure telephony session. For example, the private key can be stored in the memory of a call device or endpoint used to make the call, or the private key can be stored on a removable storage medium (e.g., a Universal Serial Bus (USB) memory device, other flash memory device, etc.) that can be utilized with various devices, such that the user can use stored private key on a number of different devices to make the call.

In step 201, a caller (or calling party), using the voice station 111 in conjunction with the ATA adapter 105, initiates a communication session over the data network 101 with a destination endpoint, e.g., digital voice device 107 (called party). This step can be performed, for example, by the caller dialing a predetermined access number, by contacting a predetermined website, etc.) or simply initiating the call directly to the other party. In the latter instance, the device used to make the call can be configured to automatically initiate establishment of the call, for example, based upon a setting on the device, or based on the detection of the presence of a private key in the memory of the device used to make the call, or other triggering mechanism.

In step 203, the respective parties request public keys from the private public key provider 121 or the public key warehouse 122, which responds with the proper public keys. That is, the calling party will receive from the key provider 121 or 122 a public key of the called party, and the called party will receive a public key of the calling party. Thus, since each party has its own private key and the public key of the other party, a secure communication session can be established, whereby voice traffic can be encrypted between the voice station 111 and the digital voice device 107 (step 205). In this manner, outgoing voice payloads are encrypted using the public key of the other party, per step 207, and incoming encrypted voice payloads are decrypted using the private key by the party receiving the incoming packet in step 209.

Thus, for example, the calling party speaks into the voice station 111, which supplies the speech signal to the adapter 105 for digitization. Subsequently, the encrypter/decrypter 115 encrypts the digitized speech using the public key of called party. This encrypted voice payload is transmitted over the data network 101 and on to the device 107, which employs the encrypter/decrypter 117 to decrypt the received voice traffic using the stored private key. Secure voice communication is provided via the encrypter/decrypter 117 to encrypt the speech signal using the public key of the calling party. This encrypted voice traffic is transmitted to the data network 101 back to the voice station 111. Thus, the voice payload flowing in both directions via the data network 101 can be securely encrypted. It is noted the data flow (e.g., voice traffic) can be encrypted in one direction (e.g., if only one of the parties to the call is authorized); however, this would only protect data flowing in one direction (e.g., the data flow to the authorized user of the secure telephony system), which would provide limited protection to the confidentially of the call.

Figure 3:
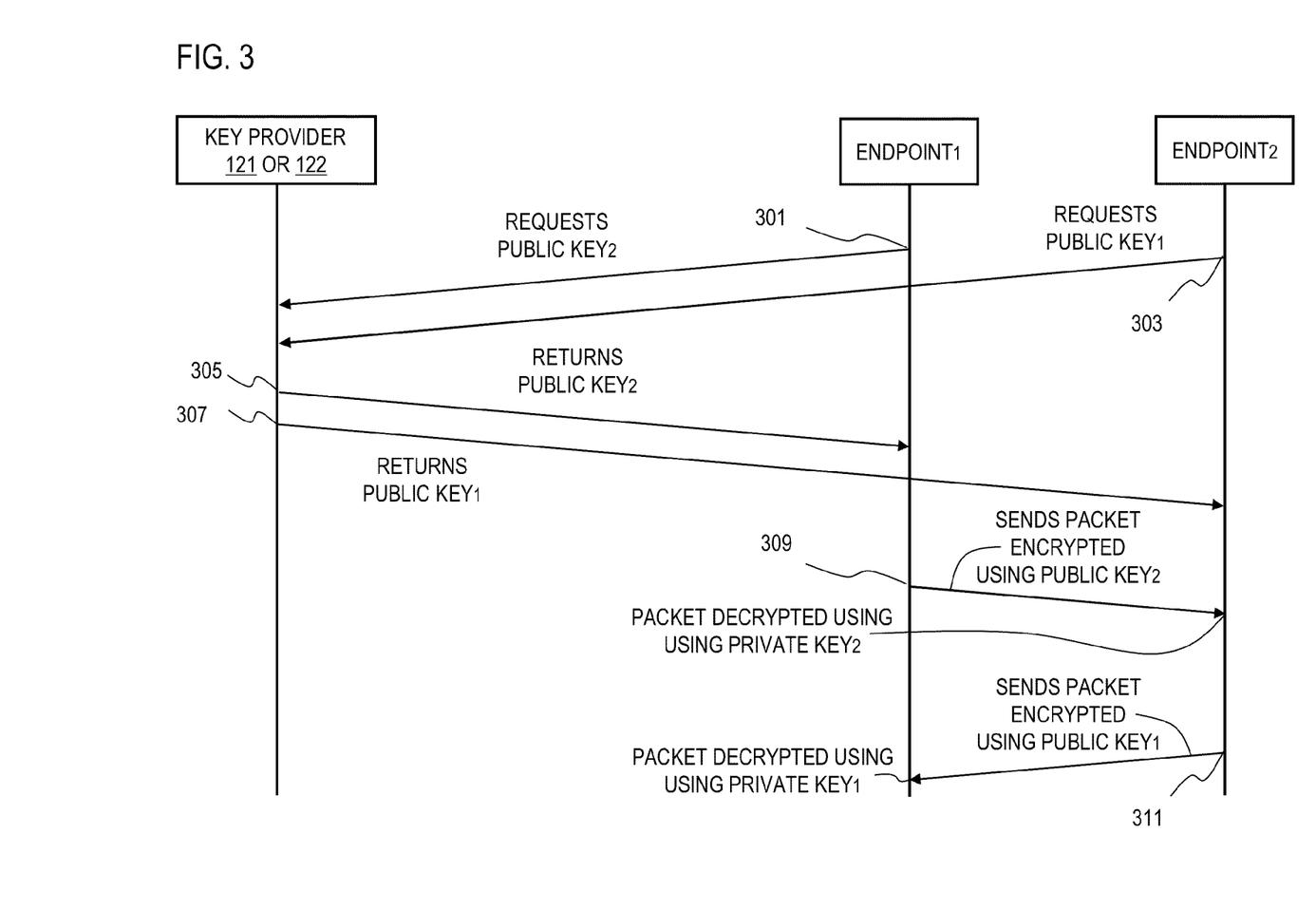
FIG. 3 depicts a process for providing secure communications by encrypting voice payloads, in accordance with an exemplary embodiment.

FIG. 3 depicts a process for providing secure communications by encrypting voice payloads, in accordance with an exemplary embodiment. In step 301, a first user sends via an Endpoint$_1$ (or source endpoint) a request for a public key from the key provider 121 (or 122) to initiate a secure telephony session between the first user and a second user. The key provider 121 or 122 can verify the first user's authorization to request the key. The key provider 121 or 122 can subsequently supply a public key$_2$ to the first user. In response to the call establishment procedure, a destination endpoint, Endpoint$_2$, will request a corresponding public key—i.e., public key$_1$ of the first user—from the key provider 121 or 122, as in step 303. The key provider 121 or 122, per steps 305 and 307, will transmit public key$_2$ and the public key$_1$ to the respective requesters. In an embodiment where the public keys are associated with URLs, the public key$_1$ and the public key$_2$ are simply retrieved upon invoking these URLs.

Per steps 309 and 311, a secure telephony session can be established between the first user's call device and the second user's call device. As shown in step 309, any packet of digitized speech data sent from the first user's call device via Endpoint$_1$ will be encrypted using the public key$_2$. Such packets will then be received by Endpoint$_2$ and decrypted using private key$_2$, which is stored at the second user's call device. Similarly, as shown in step 311, digitized speech data sent from the second user's call device via Endpoint$_2$ will be encrypted using the public key$_1$, and such packets will then be received by the Endpoint$_1$ and decrypted using private key$_1$.

Figure 4:
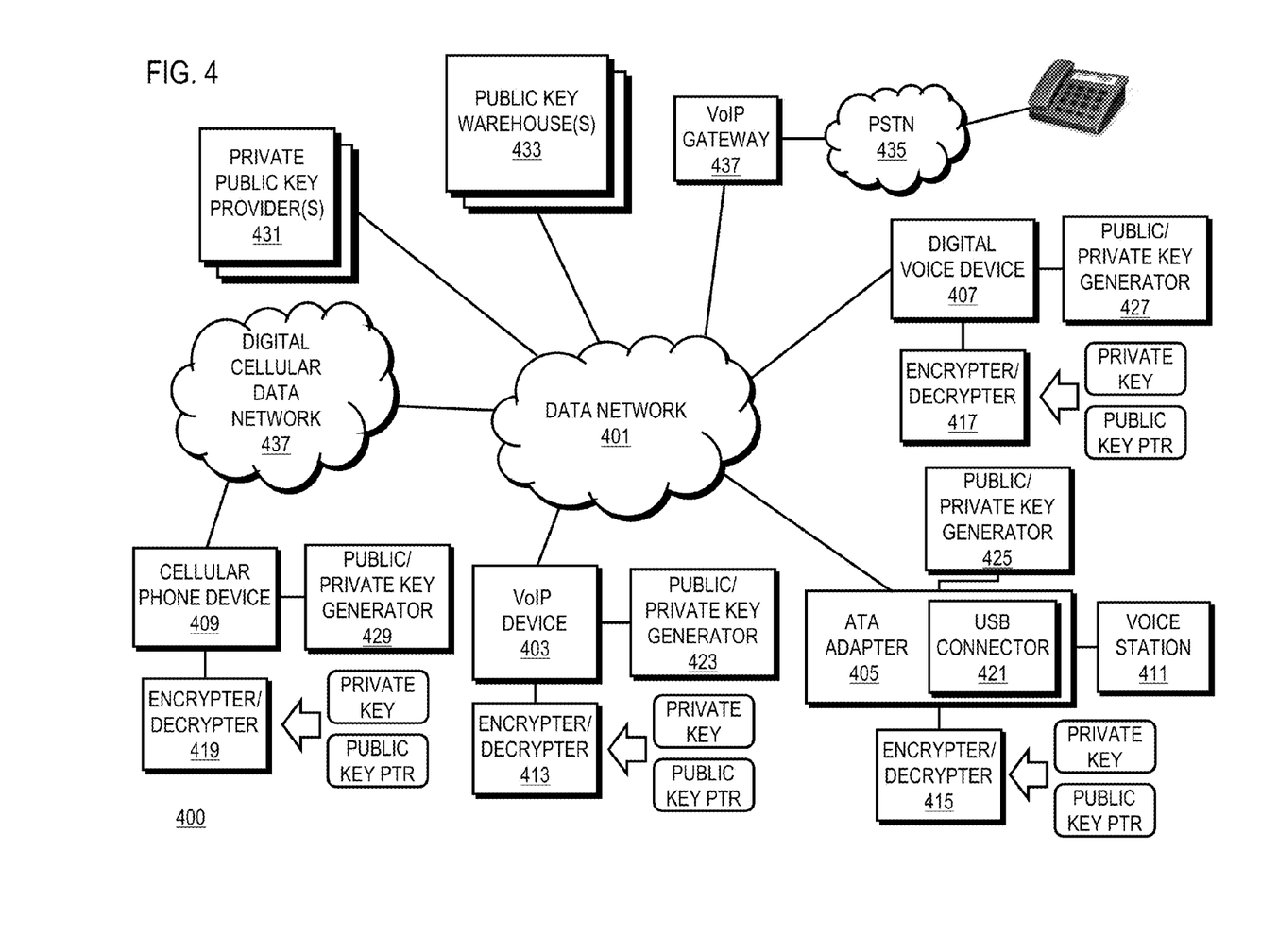
FIG. 4 depicts a data network with endpoints for providing secure encryption of voice communications between users, according to an exemplary embodiment.

FIG. 4 depicts a data network 401 with a means of using enhanced endpoints to provide secure encryption of voice communications between users, according to an exemplary embodiment. A communication system 400 includes a data network 401 that provides connectivity to a variety of call devices or endpoints 403, 405, 407, and 409 capable of transmitting and receiving packetized voice flows. In this example, the devices 403, 405, 407, and 409 include a Voice-over-Internet Protocol (VOIP) device 403, an analog terminal adapter (ATA) 405, a digital voice device 407 that can support telephony services over the data network 401, and/or a cellular phone device 409 that is connected to a digital cellular data network 437. The data network 401 can include a public data network, such as the global Internet. The endpoints (i.e., "call" devices) 403, 405, 407, and 409 can facilitate secure telephony communications among, e.g., voice stations 403, 407, 409, and 411 through the use of encrypter/decrypter modules 413, 417, 415, and 419, respectively; these encrypter/decrypter modules 413, 417, 415, and 419 are capable of encrypting data streams (e.g., voice payload) being sent to the data network 401, and decrypting incoming data streams. Exemplary call devices 403, 405, 407, and 409 include a mobile phone, wireless device, computer, etc. The analog terminal adapter (ATA) 405 performs analog-to-digital (A/D) and digital-to-analog (D/A) conversions to operate with voice station 411, which can be a traditional Plain Old Telephone Service (POTS) phone. It is contemplated that the term "endpoint" can encompass all components for providing encrypted voice payload—e.g., an ATA, VoIP phone, and/or a successor voice device.

The system 400 protects voice traffic from unauthorized access through the use of encryption at the end devices. By way of example, a secure voice communication session is established between a source call device, e.g., voice station 411, and a destination call device, e.g., device 409. In one embodiment, the ATA 405 of call device 411 can be provided with, for example, a Universal Serial Bus (USB) connector 421, other removable storage medium port for inserting a flash storage device, and/or non-removable storage device, which can contain a private key of an asymmetrical public/private key pair (and, e.g., a pointer/URL (or identifier) to where the public key is located) generated by public/private key generator 425. Then, during session initiation at the startup of the call, the encrypter/decrypter 419 of the other party (i.e., destination call device 409) can retrieve the public key of the source call device, and utilize the public key to encrypt data being sent to the source call device. Thus, each time after, the encrypters/decrypters 415, 419 encrypt the digitized speech using the respective public keys of the devices 409, 411. This encrypted codec using, for example, standard SIP protocol could still be sniffed, but the speech would be very difficult, if not impossible to decipher, without the corresponding private key. Once this SIP packet with the encrypted codec reached the source call device, the private key would be used to decrypt the codec into intelligible speech, which is private to the listener on the source call device. Each of the call devices 403, 405, 407, and 409 includes a public/private key generator 423, 425, 427, and 429, respectively, that can generate a public/private key pair for the device, as will be described in greater detail below.

As seen in FIG. 4, the secure telephony system 400 also includes one or more private public key providers 431 where the phone customer could purchase a private key for use on their phone device; and the corresponding public key could be disseminated via secure network connection. One or more public key warehouses 433 are provided, where each warehouse corresponds to, for example, a phone company and that company's devices. Both private public key providers 431 and public key warehouses 433 can store public keys for dissemination during secure communications. The public keys can be supplied by the public key warehouse 433 to devices 403, 405, 407, and 409; in this example, each of the devices 403, 405, 407, and 409 utilizes a pointer (e.g., Uniform Resource Identifier (URI)) to retrieve the actual public key from the warehouse 433. As such, the public key warehouse 433 or the private public key provider 431 distributes the public keys to the devices 403, 405, 407, and 409. With respect to the private keys, the private keys are generated in each respective device 403, 405, 407, and 409 by the respective generator 423, 425, 427, and 429, and stored in the respective device 403, 405, 407, and 409. In one embodiment, the private key can also be purchased at a Private Public Key provider 431 and transferred via a storage medium to the respective device 403, 405, 407 and 409. This approach of a purchased private key from a key provider 431, in one embodiment, could be applied to endpoint devices 403, 405, 407, and 409, assuming the software/firmware/hardware are configured appropriately.

As shown, the data network 401 can also provide connectivity to a circuit-switched telephony network, e.g., PSTN (Public Switched Telephone Network) 435, via a VOIP gateway 437 to exchange unsecure voice calls.

Additionally, the cellular phone device 409 is depicted as being connected to the data network 401 via a digital cellular data network 437.

It is recognized that the disbursal of private keys to end customers for encrypted VOIP phone calls can be a time consuming, cumbersome, and expensive process which the software should support. The software could use private/public key pairs from providers 431 such as CYBERTRUST® or VERISIGN®, but this is not desirable. This embodiment seeks to alleviate this issue by building software into the VOIP phone, cell phone device, or digital voice device to generate a pair of public/private keys for use during an encrypted voice session. This embodiment provides a scalable system to generate private keys, so the customers can have encrypted voice conversations over the public Internet or any successor data network. This technology could apply to any phone, or cable, or wireless data network used to support VOIP to carry voice traffic. This ability for encrypted voice traffic or phone calls could generate revenue for each use, from each carrier and the service provider could generate license fees for its use by any VOIP carrier or successor technology.

Figure 5:
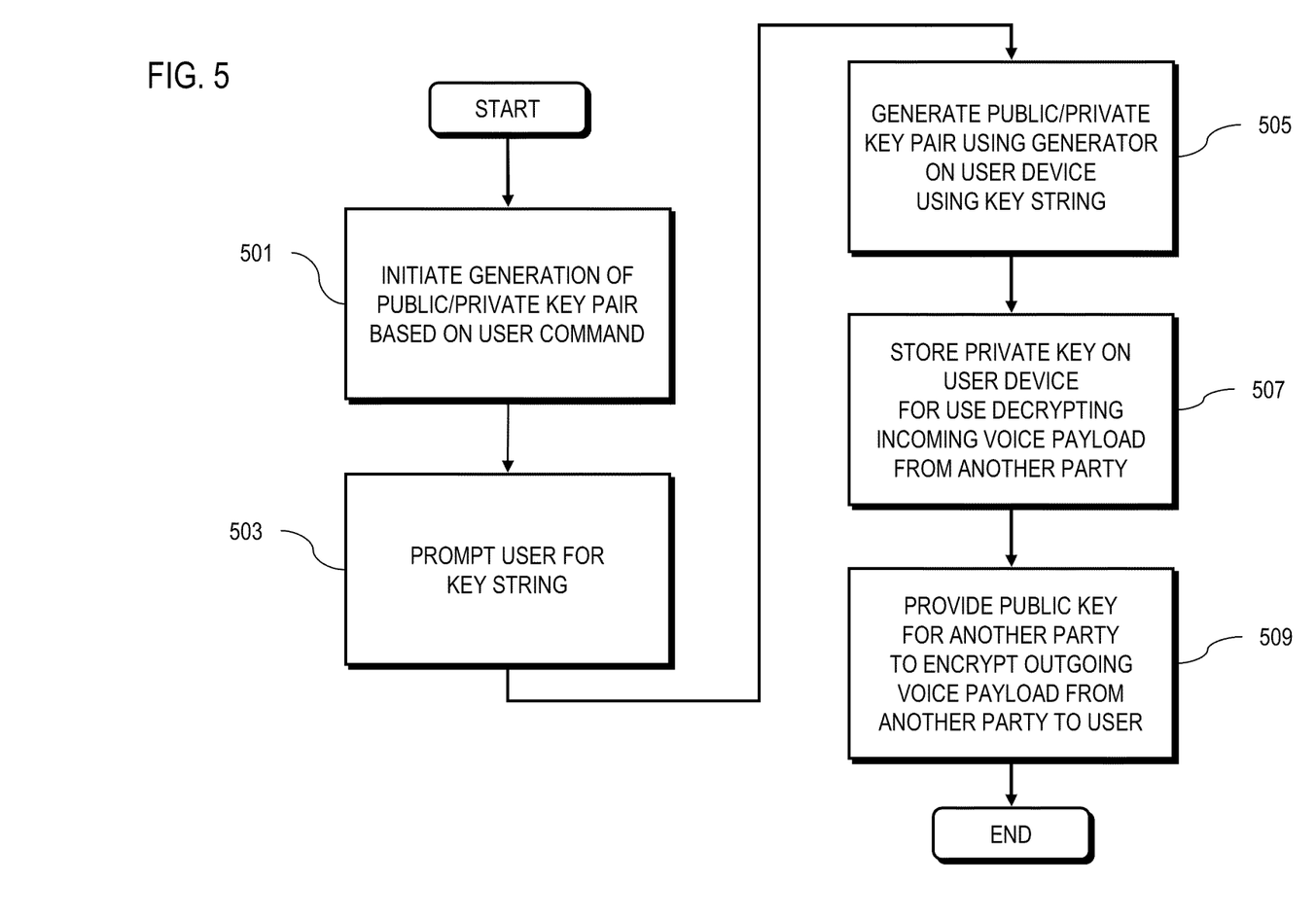
FIG. 5 is a flowchart of a process for generating and storing/distributing private and public keys for use in a communication session utilizing encrypted voice payloads, in accordance with an exemplary embodiment.

FIG. 5 is a flowchart of a process for generating and storing/distributing private and public keys for use in a communication session utilizing encrypted voice payloads, in accordance with an exemplary embodiment. In step 501, a public/private key pair generation is initiated on a user device based on a command from the user. For example, on a display screen (e.g., a liquid crystal display) of VOIP device 403, ATA adapter 405, digital voice device 407, and/or cellular phone device 409, a "Key Generation" button or widget is provided which, when pressed, would initiate the generation of the public/private key pair. By initiating the generation of such a key pair, the user would then be prompted for a key string in step 503, if a key string had not been previously stored on the user device, in which case the user device would utilize the stored key string. The key string can then be used as part of a seed, for example, with the time, random number and a challenge password, to generate a unique private/public key pair in step 505. The user could be prompted for a challenge password with sufficient information describing the importance of the length of the challenge password and the effect length has on the security of the encryption method. The key string or partial seed value can be stored on the user device, so the customer is not prompted for a seed in the future, when the private key had expired and a new private public key pair is needed.

In step 507, the private key is stored on the user device for later use in decrypting incoming voice payload from another calling party. The private key once generated would preferably be housed only on the user device. The partial seed value and the private key would not be viewable on the user device. The user could generate a private key at the user's discretion, provided the user was online and connected. In step 509, the public key is provided to the other party to the call in order to encrypt outgoing voice payload from the other party that is being transmitted to the user. The public key is preferably stored at the public key warehouse 433 and provided to the other party via the public key warehouse 433. The public key warehouse 433 can be tested to see if it is available (i.e., the user device is online) before the keys are generated. The private key would not become active until the corresponding public key of the key pair had been stored at the public key warehouse 433 and tested by the originating voice device. The generation of a public/private key pair is sufficiently intensive in computer usage that no phone calls or voice traffic should be handled during this time.

The public key of the public/private key pair is preferably housed at the public key warehouse 433 and on the user device. The transfer and housing of the public key preferably only takes place within a Secure Socket Layer (SSL) connection between the user device and the public key warehouse 433, which necessitates a TCP or successor connection attached to an IP or successor network. At the time the public key is replaced or is inserted at the public key warehouse 433 a URL (Uniform Resource Locator) for the public key would be stored on the user device to quicken the setup time of a secure voice session. The public key would be stored on the user device too, as this may allow a faster setup of a secure voice session. Some associated house keeping about the expiration date of the keys and the IP of the user device is preferably logged at the public key warehouse 433 along with the public key. The URL along with the associated private key, are the required components on both calling parties' user devices to enable setup of an encrypted VOIP session (phone call). The public/private key pair is preferably not valid any longer than the time period needed to "break" the keys, and will thus preferably expire after a predetermined time period. The valid time period of the keys can be configured as an easily configurable value stored on the user device or the customer database. The valid time period could of course vary with the type and length of the keys used with the additional security of the length of the challenge password. The phone value for length of time to key expiration preferably takes precedence over the company customer database. The user can be warned appropriately of such expiration and/or precedence.

During call setup, if the private key has expired, the customer can be warned that an encrypted conversation is not possible without a new key pair. The user can then be prompted to generate a new pair of keys. The new private key would be stored on the user device, and the new public key would be stored at both the public key warehouse 433 and the user device.

The public key warehouse 433 is significantly different from the private public key provider 431. The public key warehouse 433 will not have the ability to generate public/private key pairs. The sole purpose of the public key warehouse 433 is preferably to receive public keys via a SSL connection to or from company provided devices and to distribute public keys via an SSL connection to any phone device. Additionally, housekeeping about the expiration of the keys is preferably maintained at the public key warehouse 433.

Figure 6:
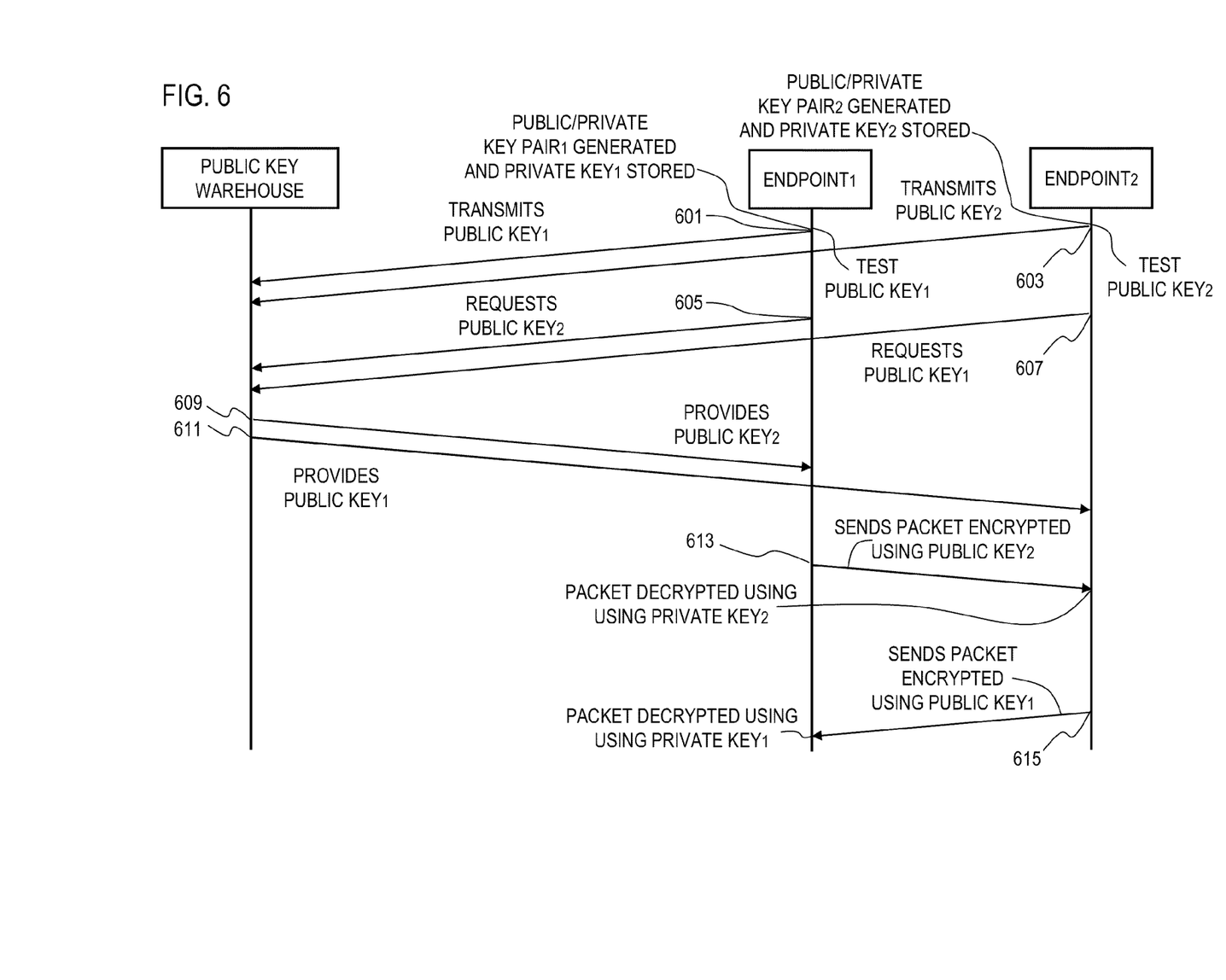
FIG. 6 depicts a process for providing secure communications by encrypting voice payloads, in accordance with an exemplary embodiment.

FIG. 6 depicts a process for providing secure communications by encrypting voice payloads, in accordance with an exemplary embodiment. In step 601, a first user uses a public/private key generator in their call device or endpoint to generate a public/private key pair$_1$ and stores private key$_1$ in their user device and then transmits public key$_1$ to the public key warehouse 433. In step 603, a second user uses a public/private key generator in their call device or endpoint to generate a public/private key pair$_2$ and stores private key$_2$ in their user device and then transmits public key$_2$ to the public key warehouse 433. Each endpoint should load its own public key from the public key warehouse 433 and encrypt then decrypt a test amount of data to certify the authenticity of the public key representing its endpoint. This process is repeated each time a new private key is generated and after the public key was stored at the public key warehouse. In step 605, Endpoint$_1$ decides to call Endpoint$_2$. The first user sends via Endpoint$_1$ (or source endpoint) a request for a public key$_2$ from the public key warehouse 433 to initiate a secure telephony session between the first user and a second user. The public key warehouse 433 can subsequently supply a public key$_2$ to the first user. In response to the call establishment procedure, a destination endpoint, Endpoint$_2$, will request a corresponding public key—i.e., public key$_1$ of the first user—from the public key warehouse 433, as in step 607. The public key warehouse 433, per steps 609 and 611, will transmit public key$_2$ and the public key$_1$ to the respective requesters. In an embodiment where the public keys are associated with URLs, the public key$_1$ and the public key$_2$ are simply retrieved upon invoking these URLs.

Per steps 613 and 615, a secure telephony session can be established between the first user's call device and the second user's call device. As shown in step 613, any packet of digitized speech data sent from the first user's call device via Endpoint$_1$ will be encrypted using the public key$_2$. Such packets will then be received by Endpoint$_2$ and decrypted using private key$_2$, which is stored at the second user's call device. Similarly, as shown in step 615, digitized speech data sent from the second user's call device via Endpoint$_2$ will be encrypted using the public key$_1$, and such packets will then be received by the Endpoint$_1$ and decrypted using private key$_1$.

The described processes, according to certain embodiments, advantageously provide a scalable, efficient approach to ensuring secure telephony services using end-to-end encryption of voice payloads, while avoiding infrastructure upgrades or modifications.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof Such exemplary hardware for performing the described functions is detailed below.

Figure 7:
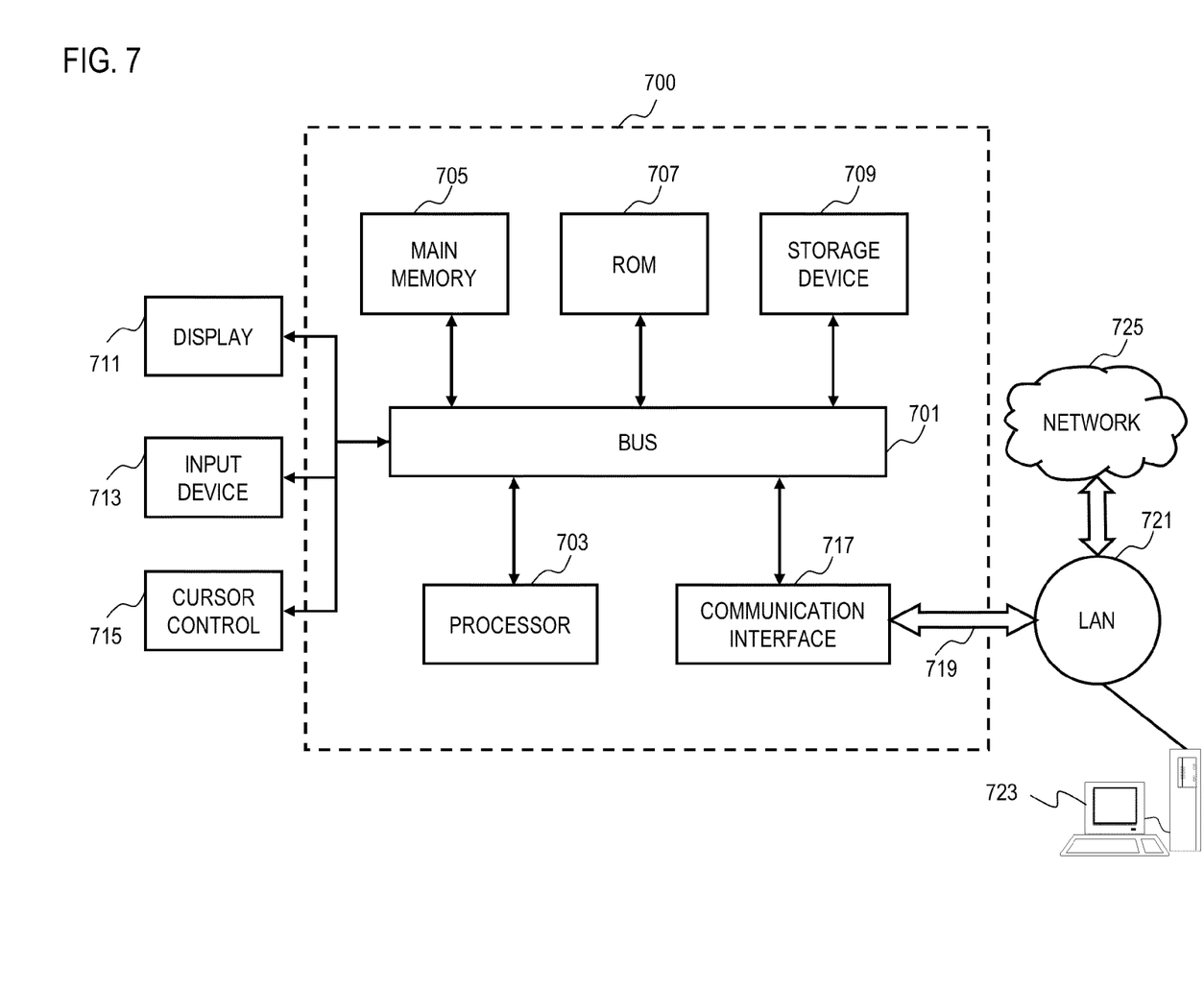
FIG. 7 depicts a computer system that can be used to implement an exemplary embodiment.

FIG. 7 illustrates computing hardware (e.g., computer system) 700 upon which an embodiment according to the invention can be implemented. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem (so long as the rate supports real-time packetized voice traffic), or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the invention has been described in connection with a number of embodiments and implementations, the invention is not so limited but covers various obvious modifications and equivalent arrangements.

The invention claimed is:

1. A method comprising:
generating, at a call device, a public/private key pair;
receiving an encrypted voice stream from another call device, wherein the encrypted voice stream being encrypted using a public key of the public/private key pair;
decrypting, at the call device, the encrypted voice stream using a private key of the public/private key pair, wherein only the private key is needed to decrypt the encrypted voice stream; and
transmitting the public key from the call device to a public key warehouse within a Secure Socket Layer connection between the call device and the public key warehouse, wherein the private key does not become active until the public key is stored at the public key warehouse and tested by the call device, and
wherein testing the private key by the call device includes loading the public key from the public key warehouse to the call device, and encrypting and decrypting a test amount to certify authenticity of the public key for the call device.

2. A method according to claim 1, further comprising:
storing the private key of the public/private key pair at the call device.

3. A method according to claim 1, further comprising:
providing the public key of the public/private key pair from the call device to the other call device.

4. A method according to claim 3,
wherein the other call device can request the public key from the public key warehouse.

5. A method according to claim 1, wherein the public/private key pair is generated using a key string entered into the call device by a user.

6. A method according to claim 5, wherein the public/private key pair is further generated using a password, and wherein the call device prompts the user for the password during initiation of a secured voice stream session with the other call device.

7. A method according to claim 1, wherein the public/private key pair expire after a predetermined period of time.

8. An apparatus comprising:
a public/private key generator configured to generate a public/private key pair;

an endpoint configured to receive an encrypted voice stream from another endpoint, wherein the encrypted voice stream being encrypted using a public key of the public/private key pair; and a decrypter configured to decrypt the encrypted voice stream using a private key of the public/private key pair, wherein only the private key is needed to decrypt the encrypted voice stream, wherein the endpoint is configured to transmit the public key to a public key warehouse within a Secure Socket layer connection between the endpoint device and the public key warehouse, wherein the private key does not become active until the public key is stored at the public key warehouse and tested by the endpoint, and wherein testing the private key by the endpoint includes loading the public key from the public key warehouse to the endpoint, and encrypting and decrypting a test amount to certify authenticity of the public key for the endpoint.

9. An apparatus according to claim 8, wherein the endpoint is configured to store the private key of the public/private key pair.

10. An apparatus according to claim 8, wherein the endpoint is configured to provide the public key of the public/private key pair to the other endpoint.

11. An apparatus according to claim 10, wherein the other endpoint can request the public key from the public key warehouse.

12. An apparatus according to claim 8, wherein the public/private key generator is configured to generate the public/private key pair using a key string entered into the endpoint by a user.

13. An apparatus according to claim 12, wherein the public/private key generator is further configured to generate the public/private key pair using a password, and wherein the endpoint is configured to prompt the user for the password during initiation of a secured voice stream session with the other endpoint.

14. A method comprising:

storing, at a public key warehouse, a first public key, wherein the first public key is generated as part of a first public/private key pair by a first call device, and a first private key of the first public/private key pair does not become active until the first public key is stored at the public key warehouse and tested;

receiving, at a public key warehouse, a first request for a first public key from a second call device, wherein the first public key was generated as part of a first public/private key pair by a first call device;

receiving, at the public key warehouse, a second request for a second public key from the first call device; and transmitting the second public key to the first call device and the first public key to the second call device for use in encrypting voice traffic associated with the secure telephony session, wherein the second public key is not needed by the first call device to decrypt the encrypted voice traffic from the second call device and the first public key is not needed by the second call device to decrypt the encrypted voice traffic from the first call device, wherein the first public key is received for storage at the public key warehouse from the first call device within a Secure Socket Layer connection between the first call device and the public key warehouse, wherein the first public key is tested by the first call device by downloading the first public key using the URI from the public key warehouse and testing the downloaded public key with the generated private key of first public/private key pair, and wherein testing by the first call device includes encrypting and decrypting a test amount to certify authenticity of the first public key for the first call device.

15. A method according to claim 14, further comprising:

storing, at the public key warehouse, an expiration time of the public/private key pair.

16. A method according to claim 14, wherein the first and second public keys are assigned public key pointers for use in the retrieval of the first and second public keys, and wherein the public key pointers includes uniform resource identifiers (URIs) or uniform resource locators (URLs).

* * * * *